(12) United States Patent
Kudoh et al.

(10) Patent No.: US 7,297,296 B2
(45) Date of Patent: Nov. 20, 2007

(54) COMPOSITE DIELECTRIC AND MANUFACTURING METHOD THEREFOR

(75) Inventors: Yuji Kudoh, Kyoto (JP); Takashi Hashida, Osaka (JP); Masa-aki Suzuki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 162 days.

(21) Appl. No.: 11/100,424

(22) Filed: Apr. 7, 2005

(65) Prior Publication Data

US 2005/0263744 A1    Dec. 1, 2005

Related U.S. Application Data

(63) Continuation of application No. PCT/JP2004/006484, filed on May 7, 2004.

(30) Foreign Application Priority Data

May 9, 2003    (JP)    ............................... 2003-131339

(51) Int. Cl.
*H01B 1/00*    (2006.01)
*B32B 3/26*    (2006.01)
*B32B 3/06*    (2006.01)
*B32B 5/14*    (2006.01)

(52) U.S. Cl. ................ 252/500; 428/304.4; 428/305.5; 428/306.6; 428/307.3; 428/307.7

(58) Field of Classification Search ............. 428/304.4, 428/305.5, 306.6, 307.3, 307.7; 252/514, 252/500
See application file for complete search history.

(56) References Cited

U.S. PATENT DOCUMENTS

| 4,469,816 A * | 9/1984 | Armor et al. ................ 502/333 |
| 6,492,014 B1 * | 12/2002 | Rolison et al. .......... 428/317.9 |
| 6,569,358 B1 * | 5/2003 | Tai et al. ..................... 252/512 |

FOREIGN PATENT DOCUMENTS

| JP | 63-242916 | 10/1988 |
| JP | 63-242916 A | 10/1988 |

(Continued)

OTHER PUBLICATIONS

Japanese Office Action mailed Jul. 20, 2005.

*Primary Examiner*—Douglas McGinty
*Assistant Examiner*—Jaison Thomas
(74) *Attorney, Agent, or Firm*—McDermott Will & Emery LLP

(57) ABSTRACT

It is a principal object of the present invention to provide a dielectric having a high relative dielectric constant and dielectric loss minimized in high frequency bands. That is, the present invention relates to a composite dielectric comprising conductive particles dispersed in a porous body of inorganic oxide, wherein 1) the relative dielectric constant $\mathcal{E}r$ of the dielectric in high frequency bands of 1 GHz or more is 4 or more, and 2) the dielectric loss $\tan\delta$ of the dielectric in high frequency bands of 1 GHz or more is $2\times10^{-4}$ or less, and to a manufacturing method therefor.

7 Claims, 3 Drawing Sheets

(a)

(b)

(c)

(d)

FOREIGN PATENT DOCUMENTS

| | | |
|---|---|---|
| JP | 3-265634 A | 11/1991 |
| JP | 03-272511 | 12/1991 |
| JP | 3-272511 A | 12/1991 |
| JP | 2002-193691 A | 7/1992 |
| JP | 07-282645 | 10/1995 |
| JP | 07-282645 A | 10/1995 |
| JP | 2002-015943 * | 1/2002 |
| JP | 2002-15943 A | 1/2002 |
| WO | WO 91/14500 | 10/1991 |
| WO | WO 01/78085 | 10/2001 |
| WO | WO 01-78085 A2 | 10/2001 |

* cited by examiner

COMPOSITE DIELECTRIC AND MANUFACTURING METHOD THEREFOR

REFERENCE TO RELATED APPLICATION

This Application is a continuation of International Application No. PCT/JP2004/006484, whose international filing date is May 7, 2004, which in turn claims the benefit of Japanese Application No. 2003-131339, filed May 9, 2003, the disclosures of which Applications are incorporated by reference herein. The benefit of the filing and priority dates of the International and Japanese Applications is respectfully requested.

TECHNICAL FIELD

The present invention relates to an electronic circuit element. More specifically, the present invention relates to a dielectric for use particularly in microwave, millimeter wave and other high frequency bands.

BACKGROUND ART

For the dielectrics used in electronic circuit elements, ceramics have conventionally been used as materials with a dielectric constant of about 10 or more. Using a material with a high dielectric constant allows the electronic circuit element to be miniaturized. It also has the advantage of reducing radiation loss because in the microwave, millimeter wave and other high frequency bands electromagnetic energy becomes concentrated in the dielectric. Application of ceramics to microwave communications devices has expanded in recent years, and materials with high dielectric constants and low dielectric loss are being developed.

A composite dielectric of conductive powder mixed with resin has been presented as a non-ceramic material having a dielectric constant of about 10 or more (Japanese Patent Publication No. S55(1980)-2044). A composite dielectric of dielectric powder mixed with resin has also been presented (Japanese Unexamined Patent Publication No. S58(1983)-166609). These composite dielectrics offer the feature of allowing the dielectric constant to be altered by changing the compounding ratio of powder in the matrix material, and have good cutting and other working properties.

DISCLOSURE OF THE INVENTION

However, those ceramic materials developed up till now which have high dielectric constants also have high dielectric loss. Moreover, the dielectric loss increases in proportion to the applied frequency. Consequently, it has been difficult to use materials with high dielectric constants in high frequency bands.

The dielectric loss of a composite dielectric depends to a large extent on the electrical resistance of the material used as the matrix. In a composite dielectric, however, dielectric loss may also occur because of electrical contact among the dispersed particles via the matrix. This is difficult to avoid even if a material with high resistivity is used as the matrix. This phenomenon is particularly conspicuous when conductive particles are used as the dispersed particles. Moreover, the dielectric loss of the matrix material itself also contributes to the dielectric loss of the composite dielectric.

For these reasons, by using as the matrix a material having extremely high or infinite electrical resistivity and having itself a dielectric loss of 0, it is possible to form a composite dielectric with low dielectric loss. And by arranging the dispersed particles at high densities it is possible to achieve a composite dielectric having both high dielectric constant and low dielectric loss characteristics. Air can be used as a material which has extremely high or infinite electrical resistivity and which itself has a dielectric loss of 0. Therefore, an ideal composite dielectric could be formed if air could be used as the matrix, but it is impossible to disperse and fix particles in air.

Consequently, it is a principle object of the present invention to provide a dielectric having a high dielectric constant and reduced dielectric loss in the high frequency bands.

The present invention relates to the following composite dielectric and manufacturing method therefor.

LIST OF ELEMENTS

Figure 1:
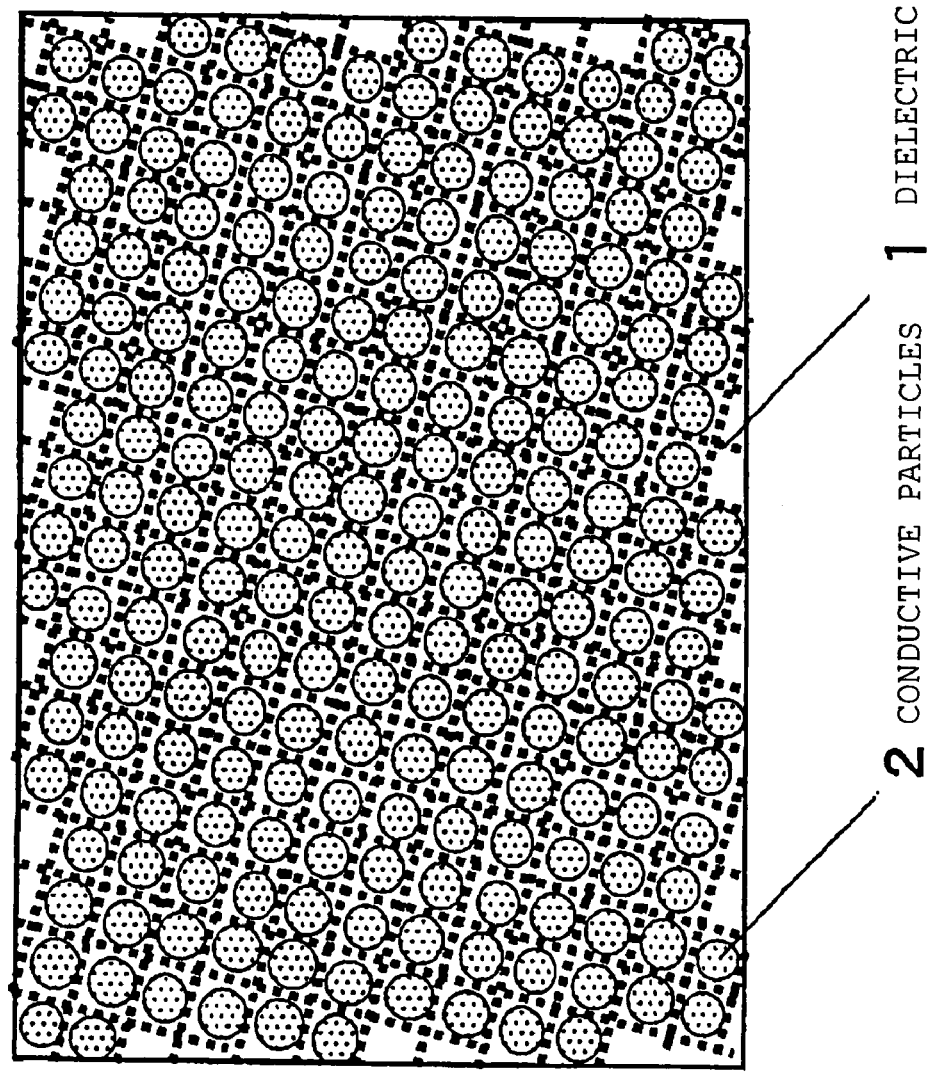
FIG. 1 shows the composite dielectric of the present invention.

1 Dielectric
2 Conductive particles
11 Starting solution for a gel
12 Conductive particles
13 Wet gel
14 Dry gel
21 Conductive particles
22 Container
23 Starting solution for a gel
24 Nozzle
25 Conductive particle composites
26 Starting solution for a gel
27 Wet gel
28 Dry gel

BEST MODE FOR CARRYING OUT THE INVENTION

1. Composite Dielectric

The composite dielectric of the present invention is a composite dielectric comprising a porous body of inorganic oxide and conductive particles dispersed in the porous body, wherein 1) the relative dielectric constant $\in r$ of the dielectric in high frequency bands of 1 GHz or more is 4 or more, and 2) the dielectric loss $\tan\delta$ of the dielectric in high frequency bands of 1 GHz or more is $2 \times 10^{-4}$ or less.

Conductive Particles

The conductivity of the conductive particles can be set appropriately according to the method of use, purpose and the like of the dielectric. In general, it is desirably 30000 S/m or more or more desirably $1 \times 10^7$ S/m or more. The material of the conductive particles can be any material having conductivity, and may be selected appropriately from known materials such as for example metals or alloys, carbon materials, metallic oxides and the like.

In particular, at least one of aluminum, nickel, copper, silver, gold, platinum, tungsten, molybdenum and alloys containing these as well as carbon black can be used. It is more preferable to use at least one of aluminum, nickel, copper, silver, gold, platinum, tungsten, molybdenum or an alloy containing at least one selected from these elements can be used favorably.

There are no limits on the particle form of the conductive particles, which may be spherical particles, scale particles, formless particles or the like. The mean particle diameter of the conductive particles depends on the frequency to be applied to the dielectric and the like, normally within the range of 100 μm or less. More specifically, the size of the conductive particles is ½ or less or preferably ¼ or less or more preferably 1/10 or less of the wavelength within the composite dielectric of the electromagnetic waves applied to the composite dielectric. In this way, the composite dielectric can act more effectively as a continuum with respect to the electromagnetic waves used.

The content of conductive particles can be determined according to the desired properties and the like. It can normally be 25% or more by volume of the dielectric and preferably be 50% or more or preferably 75% or more by volume. The upper limit of this content can be about 95% by volume from the standpoint of mechanical strength and the like.

The conductive particles can be obtained by known manufacturing methods. Examples include breaking down method with a ball mill, jet mill, agitation mill or the like, and building up method by evaporation condensation, CVD, co-precipitation, homogenous precipitation, hydrothermal synthesis or the sol-gel method.

Porous Body of Inorganic oxide

There are no particular limits on the type of inorganic oxide making up the porous body, which can by determined appropriately according to the desired properties and the like. Examples include silicon oxide (silica), aluminum oxide (alumina), titanium oxide, vanadium oxide, iron oxide, tin oxide and zirconium oxide as well as mixtures of these (mixed oxides), composite oxides and the like. One or two or more of these can be used.

In particular, an inorganic oxide with resistivity of $10^{10}$ Ω·m or more can be used favorably in the present invention. Moreover, an inorganic oxide with dielectric loss of $1 \times 10^{-3}$ or less can be used favorably in the present invention. In particular, an inorganic oxide with resistivity of $10^{10}$ Ω·m or more and dielectric loss of $1 \times 10^{-3}$ or less is most desirable. From the standpoint of these properties, it is desirable to use at least one of silica and aluminum as all or part of the inorganic oxide.

The bulk density of the porous body of inorganic oxide, the BET specific surface area and the mean pore size can be determined appropriately according to the type of inorganic oxide, the method of use and the like.

The bulk density can be determined appropriately within the range of normally about 10 to 500 kg/m$^3$ or especially within the range of no less than 50 kg/m$^3$ and no more than 400 kg/m$^3$. The specific surface area can be determined appropriately within the range of normally from about 50 m$^2$/g to 1500 m$^2$/g, especially within the range of from 100 m$^2$/g to 1000 m$^2$/g. The specific surface area is a value measured by the Brunauer-Emmett-Teller method (abbreviated below as "BET method), a nitrogen adsorption method. The mean pore size of the porous body can be determined appropriately normally within the range of from 1 nm to 1000 nm, especially within the range of from 5 nm to 50 nm.

A dry gel obtained by drying a wet gel prepared by the sol-gel method for example can be used favorably as such a porous body. The sol-gel method itself can be performed according to known methods. The specific manufacturing method can be according to the methods described below.

Material Properties of the Dielectric

The composite dielectric of the present invention has 1) a relative dielectric constant $\in$r of 4 or more (preferably 10 or more) in high frequency bands of 1 GHz or more (particularly no less than 1 GHz and no more than 32 GHz or more specifically 1 GHz, 5.5 GHz, 25 GHz and 32 GHz), and 2) a dielectric loss tanδ of $2 \times 10^{-4}$ or less (particularly $1.8 \times 10^{-4}$ or less) in high frequency bands of 1 GHz or more (particularly no less than 1 GHz and no more than 32 GHz or more specifically 1 GHz, 5.5 GHz, 25 GHz and 32 GHz). That is, the composite dielectric of the present invention has both a high dielectric constant and low dielectric loss in high frequency bands.

Moreover, the porosity of the composite dielectric of the present invention depends on the porosity of the porous body used and the like, but is desirably no less than about 4% and no more than about 75% or particularly desirably no less than 8% and no more than 50%.

EMBODIMENT 1

The composite dielectric of the present invention is explained using FIG. 1. FIG. 1 is a figure explaining an example of the composite dielectric of the present invention, which consists of dielectric 1 and conductive particles 2 which are dispersed in dielectric 1. A porous body is preferably used as dielectric 1. Using a porous body allows the apparent resistivity to be increased over that of a bulk material having the same composition.

When a porous body of porosity v is sliced on any surface, the proportion of cross-sectional area S0 occupied by the framework appearing on the surface (area s) is statistically s/S0=$(1-v)^{2/3}$. Thus, if the resistivity of the material forming the porous body is ρ0, the apparent resistivity ρ of this porous body is expressed as ρ=ρ0/$(1-v)^{2/3}$. It is thus possible to form a matrix having a higher resistivity than the bulk material, thereby reducing leakage current and providing a composite dielectric with low dielectric loss.

Silica, alumina and dielectrics containing these as principal components can be used by preference as the material of the porous body. This is because silica and alumina have high resistivity ($10^{15}$ Ω·m or more) and extremely low dielectric loss (on the order of 1/10000). However, not just silica or alumina but any material with resistivity of $10^{10}$ Ω·m or more and dielectric loss on the order of 1/1000 or less can be used as the starting material (matrix) for the dielectric.

Methods of producing the porous body include compacting of raw powder, baking of raw powder, chemical foaming, physical foaming, the sol-gel method and the like.

Moreover, a material with a conductivity σ of 30000 S/m or more can be preferably selected for conductive particles 2. By using the particles, free electrons are allowed to move rapidly through the conductive particles while loss produced in the particles is further reduced.

With respect to the conductive particles 2 used in the present invention, the particles cancel out the applied external electrical field so that the electrical field within the particles is not charged or extremely small electric charge is induced on the surface of the particles. This induced charge gives conductive particles 2 a dipole moment. Movements of charge within conductive particles 2 in response to changes in the external field are extremely fast, minimizing dielectric loss in individual conductive particles.

Methods of perparing conductive particles 2 include for example breaking down method with a ball mill, jet mill, agitation mill or the like, or building up method by evaporation condensation, CVD, co-precipitation, homogenous precipitation, hydrothermal synthesis, the sol-gel method or the like.

Aluminum, nickel, copper, silver, gold, platinum, tungsten, molybdenum or alloy particles of these or carbon black can be used favorably as conductive particles 2. In particular, more desirable effects can be obtained by using a pure metal such as aluminum, nickel, copper, silver, gold, platinum, tungsten, molybdenum or the like having a conductivity $\sigma$ (S/m) of $1 \times 10^7$ or greater. However, the material is not limited to these and may be any material having conductivity of 30000 S/m or greater which has been made into particles, including other metals and alloys, carbon powder, conductive oxides and the like.

The particle diameter of conductive particles 2 is ½ or less or preferably ¼ or less or more preferably 1/10 or less of the wavelength of the electromagnetic waves used within the composite dielectric. In this way the composite dielectric can act as a continuum with respect to the electromagnetic waves used.

Use as a composite dielectric is possible if the filling rate of conductive particles 2 is 25% or more by volume, but more desirable effects are obtained if it is 50% or more or preferably 75% or more by volume. When a conductive particle of diameter a is placed in electrical field E, the dipole moment p of the conductive particle is $p=4\pi\in0\times a^3\times E$ given $\in0$ as the dielectric constant of a vacuum. When Lorentz's internal electrical field is applied for the composite dielectric, $\in r$ is expressed as $(\in r-1)/(\in r+2)=N\alpha/3\in0$ with N being the number of particles contained in a unit volume and $\alpha$ being the polarizability of a single particle. Because $\alpha=p/E$, the dielectric constant $\in r$ of the composite dielectric when the filling rate of conductive particles 2 is 25% by volume is thus 2, equivalent to the dielectric constant of resin, while the relative dielectric constant $\in r$ of the composite dielectric is 4 at a 50% filling rate, equivalent to the relative dielectric constant of glass. At a filling rate of 75% or more, the relative dielectric constant $\in r$ of the composite dielectric is 10 or greater, equivalent to or greater than the relative dielectric constant of a dielectric ceramic.

EMBODIMENT 2

In a second embodiment of the present invention, a dry gel is used for the porous body of the first embodiment.

In the porous body of the present invention, it is desirable from the standpoint of dispersibility, support of the particles and formation of spaces between particles at high packing densities to use a material with many nanometer size pores and nanometer size structures. One such desirable material is a dry gel obtained by the sol-gel method.

A dry gel is a porous body formed by a sol-gel reaction, which is formed by drying to remove the solvent from a wet gel composed of a solid skeleton solidified by reaction of a starting solution for the gel and containing a solvent. The dry gel is a nanopore material wherein continuous pores having a mean diameter in the range of a few 100 nanometers or less are formed by means of a solid skeleton composed of particles 100 nm or less in size. By minimizing the solid components it is possible to achieve an extremely low density porous body.

An inorganic material can be used as the material for the dry gel. A dry gel of inorganic oxide (particularly the solid skeleton of the dry gel) can be applied with an ordinary ceramic such as silicon oxide (silica), aluminum oxide (alumina) or the like obtained by a sol-gel reaction as a component.

2. Method for Manufacturing a Composite Dielectric

There are no particular limits on the method for manufacturing a composite dielectric of the present invention. For example, the composite dielectric can be favorably manufacturing by drying a material comprising conductive particles and a wet gel of inorganic oxide.

Preparation of Wet Gel

The wet gel can be produced by known methods. In particular, from the standpoint of forming a network structure (porous body) of inorganic oxide it is desirable to use a wet gel prepared by the sol-gel method. A case of manufacture by the sol-gel method is explained below as a typical example.

There are no limits on the raw materials as long as a wet gel is formed by a sol-gel reaction. Raw materials used in known sol-gel methods can be employed. For example, inorganic materials such as sodium silicate, aluminum hydroxide and the like and organic materials such as tetramethoxysilane, tetraethoxysilane, aluminum isopropoxide, aluminum-sec-butoxide and other organic metal alkoxides and the like can be used. These may be selected according to the type of inorganic oxide desired.

The sol-gel method can be performed under known conditions. In general, the aforementioned raw material is dissolved in a solvent to prepare a solution (stock solution), then the solution is reacted at room temperature or under heat to form a gel. For example, a wet gel of silica ($SiO_2$) can be prepared as follows.

Examples of starting materials for silica include alkoxysilane compounds such as tetramethoxysilane, tetraethoxysilane, trimethoxymethylsilane and dimethoxydimethylsilane; oligomers of these; sodium silicate, potassium silicate and other water-glass compounds, colloidal silica and the like. These can be used alone or in mixtures.

There are no limits on the solvent as long as it dissolves the raw material but not the resulting silica. Examples include methanol, ethanol, propanol, acetone, toluene, hexane and the like as well as water. One or two or more of these can be used.

Catalysts, viscosity adjusters and various other additives can also be added as necessary. In addition to water, an acid such as hydrochloric acid, sulfuric acid or acetic acid or a base such as ammonia, pyridine, sodium hydroxide, potassium hydroxide or the like can be used as the catalyst. Ethylene glycol, glycerin, polyvinyl alcohol, silicone oil or the like can be used as the viscosity adjuster, with no limitations as long as the predetermined form of the wet gel is obtained.

The aforementioned raw materials are dissolved in a solvent to prepare a starting solution. The concentration of the solution in this case will differ depending on the types of raw materials or solvents used, the properties of the desired gel and the like, but in general the concentration of the solid components which will form the skeleton is from a few to a few tens percent by weight. After addition of the aforementioned additives as necessary, the solution can be agitated and made into the desired form by injection molding, application or the like. After a certain time in this condition, the solution will gel and the desirable wet gel can be obtained. Specifically, the raw materials form fine particles of silica as they react in the solvent, and the fine particles assemble to form a network structure, producing a wet gel.

In this case there is no limit on the temperature of the solution, which may be at room temperature or heated. When it is heated, the temperature can be set appropriately within the range below the boiling point of the solvent.

Depending on the combination of raw materials, the solution can also be cooled for purposes of gelation.

The resulting wet gel can also be surface-treated as necessary during the subsequent step of carbon precursor formation or the like for the purpose of improving solvent affinity or the like. In this case it can be treated in a wet gel state in the solvent by chemically reaction of the surface of the solid components with a surface-treating agent.

Surface-treating agents include for example trimethylchlorsilane, dimethyldichlorsilane, methyltrichlorsilane, ethyltrichlorsilane, phenyltrichlorsilane and other halogen silane; trimethylmethoxysilane, trimethylethoxysilane, dimethyldimethoxysilane, methyltriethoxysilane, phenyltriethoxysilane and other alkoxy silane; hexamethyldisiloxane, dimethylsiloxane oligomer and other silicone silane; hexamethyldisilazane and other amine silane; and propyl alcohol, butyl alcohol, hexyl alcohol, octanol, decanol and other alcohol. One or two or more of these can be selected according to the intended use of the porous body and the like.

Conductive Particles

The types, added amounts and the like of the conductive particles are as explained in 1. above.

The conductive particles may be added at any stage. For example, conductive particles may be added to the raw material before formation of the wet gel, or conductive particles may be mixed with the formed wet gel.

In the manufacturing method of the present invention, it is desirable to first coat all or part of the surfaces of the conductive particles with a wet gel of inorganic oxide. By this coating treatment it is possible to better insulate the conductive particles from each other within the dielectric. There are no limits on the method of coating, and for example it can be done by applying the aforementioned stock solution to the surfaces of the conductive particles to form a wet gel on the surfaces. The amount of coating can be determined appropriately depending on the type of conductive particles and the like. The method of applying the stock solution to the conductive particles can be a known method such as spraying, dipping or the like. For example, by spraying the aforementioned conductive particles under convection in a container with a starting solution for the aforementioned wet gel, it is possible to coat all or part of the surfaces of the aforementioned conductive particles with a wet gel of inorganic oxide.

The wet gel used to coat the particle surfaces may be of the same composition as the wet gel which forms the matrix, or the two may be of different compositions. In the present invention it is particularly desirable that the two be of the same composition.

Drying Treatment

In addition to natural drying, drying by heating, drying under reduced pressure and other normal drying methods, supercritical drying, freeze drying and the like can also be used for the drying treatment. In general, when the surface area of the dry gel is increased and the amount of solid components in the wet gel is decreased in order to achieve lower density, the gel becomes less strong. If the gel is merely dried, moreover, the gel is likely to shrink from the stress during solvent evaporation. In order to obtain a dry gel with superior porous properties from a wet gel, supercritical drying or freeze drying can be used by preference as the drying method. In this way it is possible to effectively avoid shrinkage of the gel during drying or in other words densification. Even in normal methods of drying by solvent evaporation, it is possible to reduce shrinkage of the gel during drying by using a high boiling solvent to slow down the speed of evaporation or by controlling the evaporation temperature. It is also possible to reduce shrinkage of the gel during drying by giving a water repellent treatment or the like to the surfaces of the solid components of the gel in order to control surface tension.

In supercritical drying or freeze drying, drying is accomplished without any stress to the gel skeleton from surface tension by changing the phase state of the solvent from a liquid state in order to eliminate the gas-liquid boundary. It is thus possible to reduce shrinkage of the gel during drying and to obtain a porous body of dry gel with low density. In the present invention, it is particularly desirable to employ supercritical drying.

The solvent used in supercritical drying may be a solvent contained in the wet gel. It is also desirable as necessary to substitute a solvent easy to handle in supercritical drying. Examples of solvents to be substituted include not only methanol, ethanol, isopropyl alcohol and other alcohols which directly convert the solvent into a supercritical fluid, but also carbon dioxide, water and the like. Organic solvents such as acetone, isoamyl acetate, hexane and the like which are easily eluted with these supercritical fluids can also be substituted.

Supercritical drying can be performed in an autoclave or other pressure vessel. For example, if the solvent is methanol the critical conditions of critical pressure 8.09 MPa or greater, critical temperature 239.4° C. or greater are set, and the pressure is gradually released while maintaining a constant temperature. If the solvent is carbon dioxide for example, the critical pressure is set to 7.38 MPa or greater and the critical temperature to 31.1° C. or greater, and the pressure is released from the supercritical state in the same way under constant temperature conditions to achieve a gaseous state and dry the gel. If the solvent is water for example, the critical pressure is set to 22.04 MPa or greater and the critical temperature to 374.2° C. or greater to dry the gel. The time required for drying will be at least the time required for the solvent in the gel to be replaced once or more by the supercritical fluid.

EMBODIMENT 3

Figure 2:
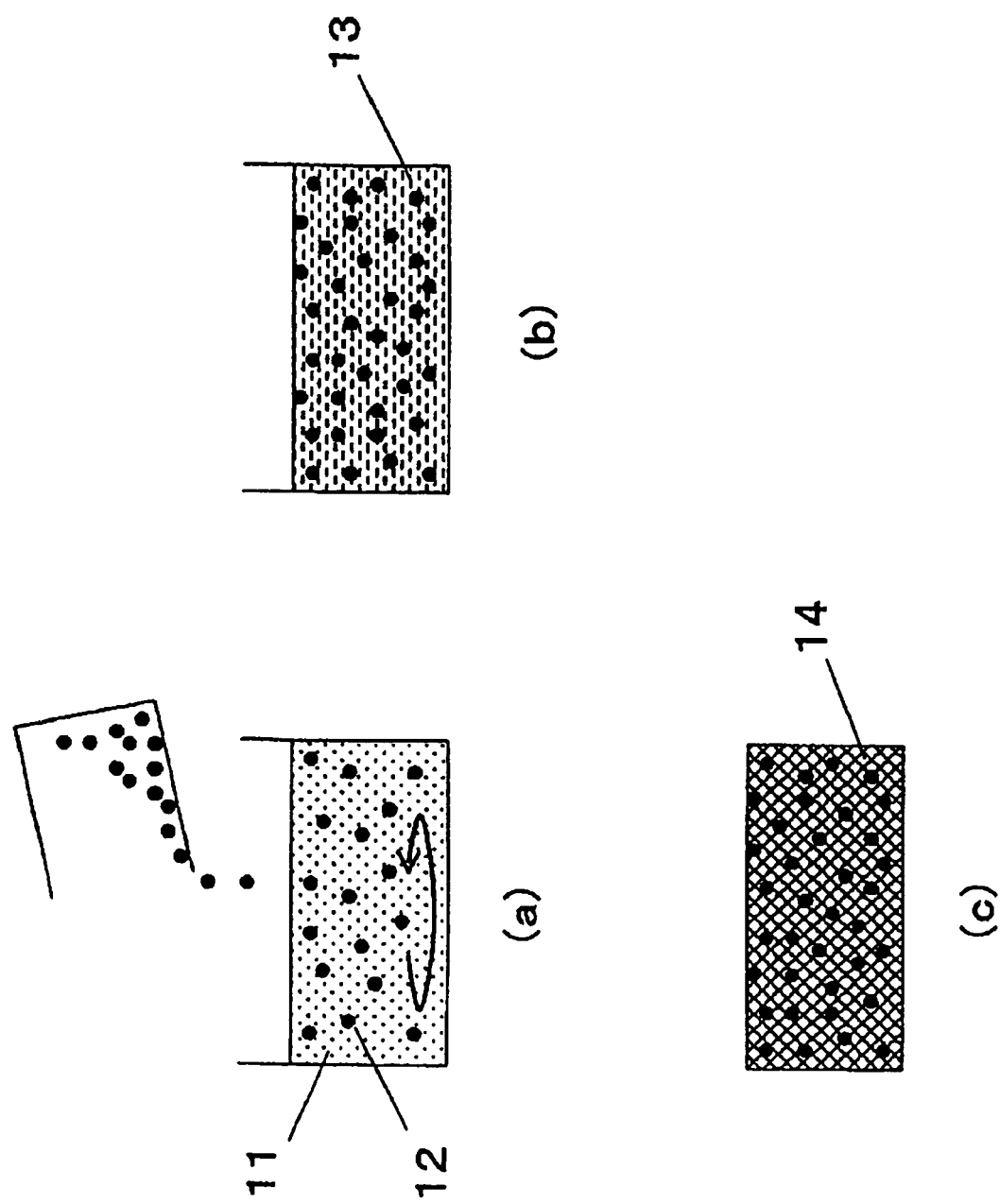
FIG. 2 shows manufacturing steps for the composite dielectric of the present invention.

An embodiment of the manufacturing method of the present invention is explained using FIG. 2.

Conductive particles 12 are added to gel stock solution 11, which was prepared with a specific composition, and dispersed by agitation. Because the permeability of gel starting solution 11 is high as long as its viscosity is low, the solution permeates the spaces between conductive particles 12. As the solution permeating these spaces gels, a porous body forms between conductive particles 12, insulating conductive particles 12 from each other. The particles are uniformly distributed within the solution by continuous agitation until the viscosity of the solution rises enough to slow down the sedimentation velocity of conductive particles 12 sufficiently. Gelation is completed with the solution maintained in the same state to produce wet gel 13, which is dried to obtain dry gel 14, wherein the particles are insulated from one another and are uniformly distributed. Due to this configuration, it is possible to form a composite dielectric with a high dielectric constant and low dielectric loss. In addition to agitation, ultrasound and other techniques can be used for distributing the particles. A combination of these techniques can also be used in order to improve dispersion of the conductive particles.

EMBODIMENT 4

Figure 3:
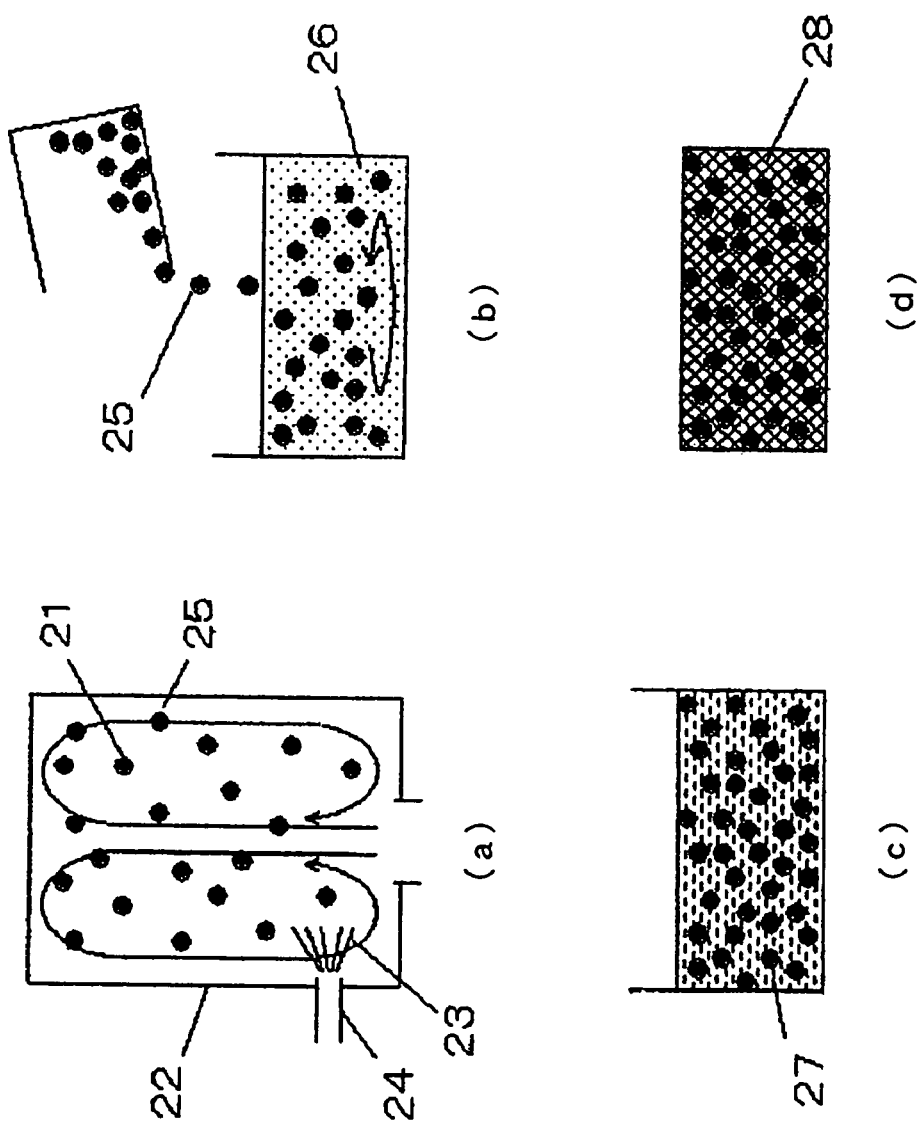
FIG. 3 shows manufacturing steps for the composite dielectric of the present invention.

Another embodiment of the manufacturing method of the present invention is explained using FIG. 3.

Conductive particles 21 are arranged in container 22, and a hot blast is sent from the bottom of the container so that particles 21 are under convection in the container. Gel stock solution 23, which was prepared with a specific composition, is sprayed into container 22 through nozzle 24, which is attached to the side of the container, so that the solution adheres to conductive particles 21. The adhering gel stock solution 23 gels while the conductive particles 21 are under convection, forming a coat on at least part of the surfaces of conductive particles 21. The resulting conductive particle composites 25 are placed in gel stock solution 26, which was prepared with a specific composition, and are dispersed by agitation. Conductive particle composites 25 are dispersed uniformly in the solution by continuous agitation until the viscosity of the solution rises enough to slow down the sedimentation velocity of conductive particle composites 25 sufficiently. Gelation is completed with the solution maintained in the same state to produce wet gel 27, which is dried to obtain dry gel 28, wherein the particles are better insulated from one another and are uniformly distributed. By this configuration, a composite dielectric with a high dielectric constant and low dielectric loss can be formed. In addition to agitation, ultrasound and other techniques can be employed as means of distributing conductive particle composites 25. A combination of these techniques can also be used in order to improve dispersion of the conductive particles.

ADVANTAGES OF THE INVENTION

As described above, because in the composite dielectric of the present invention conductive particles are distributed in a porous body of inorganic oxide, a high dielectric constant and low dielectric loss characteristics are achieved which have not been achieved with ceramic dielectrics and composite dielectrics using resin as the matrix. Namely, it is possible to achieve superior characteristics of 1) a relative dielectric constant $\in r$ of the dielectric in high frequency bands of 1 GHz or more of 4 or more, and 2) a dielectric loss $\tan \delta$ of the dielectric in high frequency bands of 1 GHz or more of $2 \times 10^{-4}$ or less. In this way it is possible to contribute greatly to miniaturization and high performance of electronic circuits.

More specifically, through the use of a porous body of inorganic oxide as a dielectric having electrical characteristics close to those of air in a configuration wherein conductive particles are dispersed in a dielectric matrix, it is possible with the composite dielectric of the present invention for particles to be dispersed and fixed as they cannot be in air and for the electrical insulation among the conductive particles, which is inadequate when resin is used, to be increased. In this configuration leakage current can be controlled, and a composite dielectric can be produced with low dielectric loss.

Moreover, because when conductive particles are packed at high densities it is possible to increase the dielectric constant of the composite dielectric while maintaining low dielectric loss, a composite dielectric can be provided having both a high dielectric constant and low dielectric loss, that has been impossible to achieve with ceramic dielectrics and dielectrics using resin as the matrix.

INDUSTRIAL APPLICABILITY

The composite dielectric of the present invention is particularly effective as a dielectric for use in microwave, millimeter wave and other high frequency bands. Consequently, it can be used in portable phones, millimeter wave wireless LANs, high-frequency signal transmitters, GPS, satellite communications devices and various other electronic devices.

EXAMPLES

The characteristics of the present invention are explained in more detail below with reference to examples. However, the present invention is not limited by these examples.

Example 1

Tetraethoxysilane, ethanol and aqueous ammonia solution (0.1 N) were mixed at mole ratios of 1:3:4 to prepare the gel stock solution. This stock solution was placed in a fluoroethylene resin container. Aluminum particles (conductivity $3.96 \times 10^7$ S/m) with a mean size of 10 μm were then added to a filling factor of 0.86, and agitated to disperse with a magnetic stirrer at room temperature.

Next, the solution was heated to 40° C. under continuous agitation using the heater of the magnetic stirrer. Once the viscosity of the solution had risen to the point that no sedimentation of the particles was observed, the solution was poured into a teflon® jig and left for 24 hours at 40° C. to obtain a cylindrical wet gel of diameter 2 mm, height 1 mm. This wet gel was washed with ethanol (solvent substitution), and supercritical dried with carbon dioxide to obtain a composite (porosity: about 12%) of aluminum particles dispersed in a dry gel. Supercritical drying was accomplished for 4 hours under conditions of pressure 12 MPa, temperature 50° C., after which the pressure was gradually released to atmospheric pressure and the temperature was then lowered.

The relative dielectric constant $\in r$ and dielectric loss $\tan \delta$ of the resulting composite were measured with a network analyzer. The results are shown in Table 1 together with the results for Comparative Example 1, a conventional ceramic ($MgTiO_3$-$CaTiO_3$) which was measured in the same way.

TABLE 1

|  | Measurement frequency (GHz) | Relative dielectric constant $\in r$ | Dielectric loss $\tan \delta$ ($\times 10^{-4}$) |
|---|---|---|---|
| Example 1 | 32 | 20 | 1.0 |
|  | 25 | 20 | 1.0 |
|  | 5.5 | 20 | 0.8 |
|  | 1 | 20 | 0.8 |
| Example 2 | 32 | 30 | 1.4 |
|  | 25 | 30 | 1.4 |
|  | 5.5 | 30 | 1.1 |
|  | 1 | 30 | 1.1 |
| Example 3 | 32 | 4 | 1.6 |
|  | 25 | 4 | 1.6 |
|  | 5.5 | 4 | 0.9 |
|  | 1 | 4 | 0.9 |
| Comparative Example 1 | 32 | 21 | 5.7 |
|  | 25 | 21 | 4.5 |
|  | 5.5 | 21 | 1.0 |
|  | 1 | 21 | 0.2 |

Example 2

Copper particles having a particle size of 10 μm to 50 μm, wherein the volume of which had been measured in advance, were placed in a metal cylinder of height 80 cm, diameter 15 cm, and a hot blast was supplied from the bottom of the container, subjecting the copper particles (conductivity 5.76×10⁷ S/r) to convection in the container. Sodium silicate was also electrodialyzed to prepare an aqueous silicate solution of pH 10 to 11 (silica component concentration 8% by weight), and the pH of this aqueous silicate solution was adjusted to 5.5 to prepare a gel starting solution. This gel starting solution was sprayed in the metal container through a nozzle on the side of the container so that it adhered to and partially coated the surfaces of the copper particles.

Upon completion of gel starting solution spraying, once the solution had gelled on the surfaces of the copper particles and the solvent had evaporated the air blast was stopped and conductive particle composites were obtained consisting of copper particles partly coated with dry gel. A gel stock solution prepared with the same composition as above was placed in a container made of a fluororesin, and the conductive particle composites was added to a filling factor of 0.91 as copper particles and dispersed by agitation using a magnetic stirrer at room temperature.

Once the viscosity of the solution had risen to the point that sedimentation of the particles was no longer observed, the solution was poured into a teflon® jig and left for 3 hours at room temperature to obtain a cylindrical wet gel of diameter 2 mm, height 1 mm. This wet gel was washed with ethanol (solvent substitution), and supercritical drying was performed with carbon dioxide to obtain a composite (porosity about 8%) of copper particles dispersed in a dry gel. Supercritical drying was performed for 4 hours under conditions of pressure 12 MPa, temperature 50° C., after which the pressure was gradually released to atmospheric pressure and the temperature was then lowered.

The relative dielectric constant ∈r and dielectric loss tanδ of the resulting composite were measured with a network analyzer. The results are shown in Table 1.

Example 3

Carbon powder having a particle size of 50 μm, wherein the volume of which had been measured in advance, were placed in a metal cylinder of height 80 cm, diameter 15 cm, and a hot blast was supplied from the bottom of the container, subjecting the carbon particles (conductivity 3.0×10⁴ S/m) to convection in the container. Sodium silicate was also electrodialyzed to prepare an aqueous silicate solution of pH 10 to 11 (silica component concentration 8% by weight), and the pH of this aqueous silicate solution was adjusted to 5.5 to obtain a starting solution for a gel. This solution was sprayed into the metal container through a nozzle on the side of the container so that it adhered to and partially coated the surfaces of the carbon particles.

Upon completion of solution spraying, once the solution had gelled on the surfaces of the carbon particles and the solvent had evaporated the air blast was stopped and conductive particle composites were obtained consisting of carbon particles partly coated with dry gel. A gel stock solution prepared with the same composition as above was placed in a fluororesin container, and the conductive particle composites were added to a filling factor of 0.5 as carbon particles and dispersed by agitation using a magnetic stirrer at room temperature.

Once the viscosity of the solution had risen to the point that sedimentation of the particles was no longer observed, the solution was poured into a teflon® jig and left for 3 hours at room temperature to obtain a cylindrical wet gel of diameter 20 mm, height 10 mm. This wet gel was washed with ethanol (solvent substitution), and supercritical drying was performed with carbon dioxide to obtain a composite (porosity about 45%) of carbon particles dispersed in a dry gel. Supercritical drying was carried out for 4 hours under conditions of pressure 12 MPa, temperature 50° C., after which the pressure was gradually released to atmospheric pressure and the temperature was then lowered.

The relative dielectric constant ∈r and dielectric loss tanδ of the resulting composite were measured with a network analyzer. The results are shown in Table 1.

The invention claimed is:

1. A method for manufacturing a composite dielectric comprising a porous body of an inorganic oxide and conductive particles dispersed in the porous body,
wherein
1) the relative dielectric constant ∈r of said dielectric in high frequency bands of 1 GHz or more is 4 or more, and
2) the dielectric loss tanδ of said dielectric in high frequency bands of 1 GHz or more is $2\times10^{-4}$ or less.
the method comprising a step of drying a material containing conductive particles and a wet gel of an inorganic oxide,
wherein the material is obtained by mixing the conductive particles with a starting solution for the wet gel and then gelling the starting solution, and
wherein all or part of the surface of the conductive particles is coated with a wet gel of an inorganic oxide before the conductive particles are mixed with the starting solution.

2. The manufacturing method according to claim 1, wherein all or part of the surface of said conductive particles is coated with a wet gel of an inorganic oxide by spraying a starting solution for the wet gel on the conductive particles under convection in a container.

3. The manufacturing method according to claim 1, wherein the wet gel is prepared by the sol-gel method.

4. The manufacturing method according to claim 1, wherein the conductivity σ of the conductive particles is 30000 S/in or more.

5. The manufacturing method according to claim 1, wherein the conductive particles are added so that the content of the particles is from 75% by volume to 95% by volume in the dielectric.

6. The manufacturing method according to claim 1, wherein the mean particle diameter of the conductive particles is 100 μm or less.

7. The manufacturing method according to claim 1, wherein the conductive particles are at least one of aluminum, nickel, copper, silver, gold, platinum, tungsten, molybdenum or an alloy of these.

* * * * *

UNITED STATES PATENT AND TRADEMARK OFFICE
CERTIFICATE OF CORRECTION

PATENT NO. : 7,297,296 B2
APPLICATION NO. : 11/100424
DATED : November 20, 2007
INVENTOR(S) : Yuji Kudoh It is certified that error appears in the above-identified patent and that said Letters Patent is hereby corrected as shown below:

Title page, item (57) ABSTRACT, line 6 of abstract, change "constant ¥r" to -- constant εr --, Under section "The invention claimed is:", Column 12, line 26, change "$2\times10^{-4}$ or less." to -- $2\times10^{-4}$ or less, --

Column 12, line 47, change "30000 S/in or more." to -- 30000 S/m or more. --

Signed and Sealed this

Tenth Day of June, 2008

JON W. DUDAS
*Director of the United States Patent and Trademark Office*